(12) United States Patent
Iyer et al.

(10) Patent No.: US 10,513,617 B2
(45) Date of Patent: *Dec. 24, 2019

(54) ENHANCED PERFORMANCE OF MINERAL BASED AQUEOUS BARRIER COATINGS

(71) Applicant: BASF Corporation, Florham Park, NJ (US)

(72) Inventors: Rajan R. Iyer, Watkinsville, GA (US); Richard Berube, Holmdel, NJ (US); Michael B. Sigman, Haddock, GA (US); Sharad Mathur, Tega Cay, SC (US); Kenneth W. Folmar, Macon, GA (US); John D. Serafano, Grosse Ile, MI (US); Ashok Khokhani, Manalapan, NJ (US); Jennifer Rigney, Dearborn, MI (US); James Royce Godfrey, Tennille, GA (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,656

(22) Filed: Oct. 2, 2017

(65) Prior Publication Data

US 2018/0022932 A1 Jan. 25, 2018

Related U.S. Application Data

(63) Continuation of application No. 13/842,986, filed on Mar. 15, 2013, now Pat. No. 9,803,088, which is a continuation-in-part of application No. 12/861,626, filed on Aug. 23, 2010, now abandoned.

(60) Provisional application No. 61/236,286, filed on Aug. 24, 2009.

(51) Int. Cl.
| | |
|---|---|
| *C08L 9/00* | (2006.01) |
| *C09D 5/02* | (2006.01) |
| *C08L 9/08* | (2006.01) |
| *C09D 7/62* | (2018.01) |
| *C08K 3/34* | (2006.01) |
| *C08K 9/04* | (2006.01) |
| *C08K 9/06* | (2006.01) |
| *C08L 25/12* | (2006.01) |

(52) U.S. Cl.
CPC .............. *C09D 5/028* (2013.01); *C08L 9/08* (2013.01); *C09D 7/62* (2018.01); *C08K 3/34* (2013.01); *C08K 3/346* (2013.01); *C08K 9/04* (2013.01); *C08K 9/06* (2013.01); *C08L 25/12* (2013.01)

(58) Field of Classification Search
CPC .. C09D 5/028; C09D 7/62; C08L 9/08; C08L 25/12; C08K 3/34; C08K 3/346; C08K 9/04; C08K 9/06
USPC ....................................................... 523/200
See application file for complete search history.

(56) References Cited

U.S. PATENT DOCUMENTS

| | | | |
|---|---|---|---|
| 3,754,956 A | 8/1973 | Durrant et al. | |
| 3,844,819 A | 10/1974 | Windle | |
| 4,061,503 A | 12/1977 | Berger et al. | |
| 4,151,154 A | 4/1979 | Berger | |
| 4,169,737 A * | 10/1979 | Burke, Jr. .............. | C09D 17/00 523/200 |
| 4,191,670 A | 3/1980 | Strauch et al. | |
| 4,339,581 A | 7/1982 | Totten et al. | |
| 4,348,234 A | 9/1982 | Cespon | |
| 4,686,260 A | 8/1987 | Lindemann | |
| 4,782,109 A | 11/1988 | Dulaney et al. | |
| 5,663,224 A | 9/1997 | Emmons et al. | |
| 5,897,411 A | 4/1999 | Stark et al. | |
| 6,150,289 A | 11/2000 | Chen et al. | |
| 6,239,194 B1 | 5/2001 | Standke et al. | |
| 6,346,145 B1 | 2/2002 | Hen et al. | |
| 6,585,822 B2 | 7/2003 | Berube et al. | |
| 6,596,071 B2 | 7/2003 | Hayashi et al. | |
| 6,811,600 B2 | 11/2004 | Mathur et al. | |
| 6,878,767 B2 | 4/2005 | Kenig | |
| 7,494,541 B2 | 1/2009 | Patel et al. | |
| 7,579,081 B2 | 8/2009 | Brown | |

(Continued)

FOREIGN PATENT DOCUMENTS

| | | |
|---|---|---|
| EP | 0273583 | 7/1988 |
| EP | 0770493 A1 | 5/1997 |

(Continued)

OTHER PUBLICATIONS

BASF. "Luwax Poligen waxes and wax emulsions for industrial applications." May 2008, 6 pages.

(Continued)

*Primary Examiner* — Hannah J Pak

(74) *Attorney, Agent, or Firm* — Meunier Carlin & Curfman LLC

(57) ABSTRACT

A method for preparing an aqueous based coating system, and coating systems made thereby, for coating onto paper and/or paperboard for providing barrier to liquid, moisture vapor, oil and grease including a pigment and a polymer emulsion system or natural based binding system. One alternative of the method includes surface treating a pigment to form a pigment system and mixing a polymer emulsion system or natural based binding system with the pigment system. Another alternative of the method includes mixing a pigment and polymer emulsion system or natural based binding system and hydrophobizing the polymer emulsion system or natural based binding system by adding silanes, siloxanes, siloxane/silicone resin blends, or their carbon based analogs.

20 Claims, No Drawings

(56) References Cited

U.S. PATENT DOCUMENTS

| | | | |
|---|---|---|---|
| 9,803,088 B2* | 10/2017 | Iyer | C08L 9/08 |
| 2002/0129741 A1 | 9/2002 | Berube et al. | |
| 2003/0085012 A1 | 5/2003 | Jones et al. | |
| 2004/0067529 A1 | 4/2004 | Goodman et al. | |
| 2004/0161594 A1 | 8/2004 | Joyce et al. | |
| 2005/0170110 A1 | 8/2005 | Wakai | |
| 2005/0203236 A1 | 9/2005 | Prowell et al. | |
| 2006/0014879 A1 | 1/2006 | Nemeh et al. | |
| 2006/0157212 A1 | 7/2006 | Berube et al. | |
| 2006/0167212 A1 | 7/2006 | Jin | |
| 2007/0240619 A1 | 10/2007 | Munchow | |
| 2007/0266898 A1 | 11/2007 | Gane et al. | |
| 2008/0053336 A1* | 3/2008 | Craig | C09C 1/3623 106/446 |
| 2008/0171818 A1 | 7/2008 | May | |
| 2008/0210394 A1 | 9/2008 | Mahr et al. | |
| 2009/0025612 A1 | 1/2009 | Patel et al. | |
| 2010/0160526 A1 | 6/2010 | Sigman et al. | |
| 2011/0046284 A1 | 2/2011 | Berube et al. | |

FOREIGN PATENT DOCUMENTS

| | | |
|---|---|---|
| EP | 1103581 A2 | 5/2001 |
| EP | 1403427 | 3/2004 |
| EP | 1640419 | 3/2006 |
| EP | 1764345 A1 | 3/2007 |
| EP | 2053163 A1 | 4/2009 |
| EP | 2470718 | 7/2015 |
| JP | H09291499 | 11/1997 |
| JP | 2000265395 | 9/2000 |
| JP | 4381170 | 10/2009 |
| WO | 006022861 | 3/2006 |
| WO | 2007125312 | 11/2007 |
| WO | 007140008 | 12/2007 |
| WO | 2008034806 | 3/2008 |
| WO | 2009134538 | 11/2009 |
| WO | 2010042162 | 4/2010 |
| WO | 2010052571 | 5/2010 |
| WO | 2011014545 | 2/2011 |
| WO | 2011028499 | 3/2011 |

OTHER PUBLICATIONS

Bayer Material Science AG. "Products and Properties Bayhydrol®/Bayhydur® for Coatings." Feb. 3, 2005, 18 pages.

Communication of a Notice of Opposition, submitted by opponent Hanns-Juergen Grosse in European Patent No. 2470718 B1 on Apr. 29, 2016, 24 pages.

Communication of a Notice of Opposition, submitted by opponent OMYA International AG in European Patent No. 2470718 B1 on Apr. 29, 2016, 24 pages.

Communication of a Notice of Opposition, submitted by opponent Stora Enso OYJ in European Patent No. 2470718 B1 on Apr. 29, 2016, 20 pages.

Exhibit E3: Figure showing "Mass Frequency Percent vs. Diameter," 1 page.

BYK additives & instruments, Data sheet regarding "BYK-024." Downloaded from www.byk.com/en/additives/additives-by-name/byk-024.(2h(2 on Apr. 27, 2016, 2 pages.

Rawle, Alan. "The importance of particle sizing to the coatings industry. Part 1: particle size measurement." Advances in Colour Science and Technology, 5 (1), Jan. 1, 2002, 12 pages.

Zhu et al., Pigment Technology, Chemical Industry Press, 2002, pp. 48-52.

Telephone Notification received in related CN Application No. 2010800478282 dated Dec. 29, 2015.

Fourth Office Action received in related CN Application No. 201080047828.2 dated Jul. 11, 2012 and English translation.

Communication of a Notice of Opposition, issued in European Patent No. 2470718 on Jan. 14, 2016, 12 pages.

European Search Report issued in related EP Application No. 10814222.5-2102 dated Jan. 22, 2013.

International Preliminary Report on Patentability issued in related International Application No. PCT/US2010/046415 dated Apr. 25, 2011.

International Search Report and Written Opinion issued in related International Application No. PCT/US2010/046415 dated Apr. 25, 2011.

Observations according to Art. 115 (1) EPC concerning European patent application EP 11 756 718.0 in the name of Imerys Kaolin Inc., 12 pages.

* cited by examiner

ENHANCED PERFORMANCE OF MINERAL BASED AQUEOUS BARRIER COATINGS

CROSS-REFERENCE TO RELATED APPLICATIONS

This application is a continuation of U.S. application Ser. No. 13/842,986 filed Mar. 15, 2013, which is a continuation-in-part of U.S application Ser. No. 12/861,626 filed Aug. 23, 2010, which claims benefit to U.S. Provisional Application No. 61/236,286 filed on Aug. 24, 2009, the disclosures of which are expressly incorporated herein by reference in their entireties.

FIELD OF THE INVENTION

The disclosure is directed to high performance pigment containing coating systems for use in aqueous-based barrier coatings. In particular, the disclosure includes novel pigment systems and blending technologies applied to aqueous based coating systems that will provide desired properties in paper and paper board based packaging.

BACKGROUND

Corrugated fiberboard containers are used in many high humidity bulk packaging applications such as for fresh fruit and produce items. To overcome the known impairment in the strength of corrugated fiberboard in high humidity service, it is customary to treat such containers, or the corrugated fiberboard sheets or blanks from which the containers are formed, by impregnating them with a material resistant to moisture.

Applications can also include films for food items such as cookie and cracker packaging. In these particular cases, the object of the package is not only to hold the contents, but also to provide resistance to moisture vapor transmission (from the environment to inside the package). Otherwise, moisture vapor would diminish the shelf life of the contained cookies, crackers, or the like. Shelf life is determined by the time it takes the products to pick up sufficient moisture to render them stale. In cookie and cracker packaging applications, for example, the general object of the barrier layer is to substantially keep moisture out or to slow its ingress.

In the past, external coating layers of high density polyethylenes (HDPE) were needed to achieve a target water vapor transmission resistance (WVTR) or aqueous fluid (hot or cold) transmission resistance. Typically, these external coatings also included the addition of a second coating layer to provide other desired properties such as tear resistance, and/or mechanical properties such as heat seal. Often the materials used in the second coating layer were relatively poor in WVTR or aqueous fluid (hot or cold) transmission resistance.

Such combinations typically result in added costs and may affect other important properties necessary to the packaging industry. Therefore, a need exists for a moisture barrier film or container fabricated such that the article will have relatively good WVTR or aqueous fluid (hot or cold) transmission resistance combined with improved physical properties.

SUMMARY

This disclosure is directed to novel pigment systems (including components not classified as pigments) and formulations for use in an aqueous coating system applied onto cellulosic (paper and/or paperboard) and non-cellulosic substrates (polyethylene (PE), polylactic acid (PLA), polyvinyl acetate (PVAc), etc.) to impart barrier properties. This disclosure is also directed to a paper or paperboard coated with a pigment system in an aqueous coating system.

In a first aspect, the disclosure relates to a method for preparing an aqueous based coating system for coating onto paper and/or paperboard for providing barrier to liquid, moisture vapor, oil and grease. The method includes the steps of surface treating a pigment to form a pigment system, and mixing a polymer emulsion system or natural based binding system with the pigment system.

In a second aspect, the disclosure relates to an aqueous based coating system for coating onto paper and/or paperboard for providing barrier to liquid, moisture vapor, oil and grease. The coating system includes a polymer emulsion system or natural-based binding system and a pigment system. The pigment system comprises a surface treated pigment.

In a third aspect, the disclosure relates to a coating system for coating onto a paper and/or paperboard. The coating system includes a pigment and a polymer emulsion or natural-based binding system that has been hydrophobized by the addition of materials selected from the group consisting of silanes, siloxanes, siloxane/silicone resin blends, and their carbon-based analogs.

In a fourth aspect, the disclosure relates to a method for preparing an aqueous based coating system for coating onto paper and/or paperboard for providing a barrier to liquid, moisture vapor, oil and grease. The method includes the steps of mixing a polymer emulsion system or natural based binding system with a pigment, and hydrophobizing the polymer emulsion system or natural based binding system by adding a material selected from the group consisting of silanes, siloxanes, siloxane/silicone resin blends, and their carbon-based analogs.

In an embodiment of any of the four aspects, the pigment or pigment system is modified by a thermal treatment process.

In an embodiment of any of the four aspects, the pigment is surface treated with materials selected form the group consisting of surfactants, hydrophobically-modified polymers, styrene-acrylic resin emulsion, styrene-butadiene latex emulsions, blends of styrene acrylic and styrene butadiene latex emulsions, and silanes, siloxanes, siloxane/silicone resin blends, and their carbon-based analogs.

In an embodiment of any of the four aspects, the pigment is at least one inorganic material selected from kaolin, bentonite, mica, talc, attapulgite, and zeolite.

In an embodiment of any of the four aspects, the polymer emulsion system comprises a styrene-acrylic resin emulsion.

In an embodiment of any of the four aspects, an additive to improve blocking is added to the polymer emulsion system or natural based binding system and pigment system.

In a certain embodiment of any of the four aspects, the additive to improve blocking comprises a material selected from the group consisting of calcium stearate, styrene-acrylic resin, acrylic resin, and polyethylene-paraffin wax emulsion.

In a certain embodiment of any of the four aspects, the pigment system comprises surface treated kaolin having a particle size of at least 20% by weight finer than 2 micrometers.

As used herein, the term pigment refers to minerals as known to one skilled in the arts as, for example, kaolin, bentonite, mica, talc, attapulgite and zeolite, in their natural or synthetic form and any combination thereof. Pigment systems refer to pigments that have been surface treated to enable or improve barrier properties. The surface treatment comprises treating with various materials known to one' skilled in the art, for example, surfactants, hydrophobically-modified polymers, styrene-acrylic resin emulsion, styrene-butadiene latex emulsions, blends of styrene acrylic and styrene butadiene latex emulsions, and silanes, siloxanes, siloxane/silicone resin blends, and their carbon-based analogs.

As used herein, the term polymer emulsion or latex includes materials such as acrylic resin emulsions, styrene-acrylic resin emulsions, styrene-butadiene latex emulsions, and blends of styrene acrylic and styrene butadiene latex emulsions. Monomers suitable for use in the production of emulsion systems for paper coating or binding formulation can generally be ethylenically unsaturated monomers including styrene, butadiene, vinyl acetate, carboxylic acids, (meth)acrylic acid esters, (meth)acrylamide, and (meth)acrylonitrile. As used herein, the term natural-based binding system is known to one skilled in the art as, for example, starches, proteins and caseins.

Polymer emulsion system refers to polymer emulsions and various additives, such as a cross linker or a defoamer, that when combined with the pigment or pigment system make the coating system.

As used herein, the term emulsion system refers to various emulsions for combining with the pigment system to develop the coating system. Emulsion systems (also commonly referred to as latexes) comprise styrene-acrylic resin emulsion, styrene-butadiene latex emulsions, blends of styrene acrylic and styrene butadiene latex emulsions etc. Monomers suitable for use in the production of emulsion systems for paper coating or binding formulation can generally be ethylenically unsaturated monomers including styrene, butadiene, vinyl acetate, carboxylic acids, (meth)acrylic acid esters, (meth)acrylamide, and (meth)acrylonitrile.

As used herein, the term "inorganic materials" includes materials such as carbides, oxides and nitrides.

DESCRIPTION OF PREFERRED EMBODIMENTS

This disclosure is related to a pigment and a coating system design that significantly slow the transportation kinetics of target species such as liquid, moisture vapor, oil and grease. It involves manipulation of the physical attributes of elements of the aqueous coating system; specifically the pigment system being used and/or the binder system being employed.

In certain embodiments, the physical attributes of the pigment include at least one of the following:
  The pigments having acceptable morphology appropriate to a given application;
  Controlled surface area, engineered morphology particles;
  Ultrafine size particles;
  Highly porous particles having pore size distribution and surface area tailored to the target barrier coating application; and
  High surface area particles.

The pigment may also undergo a thermal treatment process and then, with or without the thermal treatment, can be subjected to a surface treatment that will facilitate repulsion of water and/or significantly slow the rate of diffusion of the target species (high surface tension or contact angle). Surface treatments may include but are not limited to:
  Surfactants such as stearates;
  Hydrophobically modified polymers such as polyethylenimine (PEI);
  Styrene-acrylic resin emulsion chemistries;
  Styrene-butadiene latex chemistries;
  Synergistic blends of styrene acrylic and styrene butadiene latex chemistries; and
  Surface treatments including but not limited to silanes, siloxanes, siloxane/silicon resin blends, and their carbon-based analogs.

The pigment system can be a stable slurry that can contain any of the combination of pigments described above as well as a dispersant, an optional defoamer and a thickener. The dispersant can be a latex, starch or polyvinyl alcohol (PVAL). Natural thickening aids such as starch or protein or synthetic polymers such as Sterocoll FS (available from BASF Corporation) can be used to thicken and/or stabilize the pigment system.

In certain embodiments, the pigment system is mixed with a polymer emulsion system, a natural based binding system, or a combination thereof. Surface treated pigments cannot be made down in water, because such surface treated pigments float in water. The inability to be made down can result in poor rheological stability, fisheyes, and/or coating unevenness. However, the addition of a polymer emulsion system or a natural based binding system to the water can remedy many of these problems. The polymer emulsion system or natural based binding system can be added to the aqueous based coating system in an amount of 5 to 75 parts. In particular embodiments, the polymer emulsion system or natural based binding system is added in amounts of 5 to 50 parts, 5 to 35 parts, 10 to 20 parts, or about 10 parts. In more particular embodiments, the polymer emulsion system is a styrene-acrylic emulsion. In certain embodiments, the polymer emulsion system can be a soft film forming styrene-acrylic emulsion that provides flexibility and water resistance, and is allowed to be used in direct food contact applications. In particular embodiments, the styrene-acrylic emulsion can have an acid number (NV) of from 50-75, 55-70, or 60-65. In certain embodiments, the styrene-acrylic emulsion can have a glass transition temperature (Tg) measured in degrees Celsius of from −50 to 0, −40 to 10, −30 to 20, or −30 to 25. An exemplary acrylic emulsion for use as the polymer emulsion system is Joncryl® 3030, which is an acrylic resin emulsion from BASF Corporation.

The barrier coating formulation can comprise or consist of the pigment system, an optional defoamer/deaeration/antifoam agent, a cross linker (glyoxal or AZC for example), and a binder. The binder can be a styrene acrylic resin emulsion (SA), a styrene butadiene latex (SB latex), acrylic resin emulsion, PVAL, starch, protein and a combination thereof. The binder can also contribute to the barrier properties.

The barrier coating formulation can also comprise additives to improve the blocking tendency of the coated paperboard. Additives that improve blocking include calcium stearate, styrene-acrylic emulsions, acrylic emulsions, polyethylene-paraffin wax emulsions, and minerals such as talc or mica. Blocking tendency of the coated paperboard can also be improved by using particular pigment-resin ratios. In certain embodiments, the pigment to resin ratio is from 10:1 to 1:10, from 5:1 to 1:5, from 4:1 to 1:4, from 3:1 to 1:3, from 2:1 to 1:2, from 1.5:1 to 1:1.5, or about 1:1.

To further illustrate embodiments of the invention, various examples are given below. Throughout these examples, as well as the rest of the specification and claims, a variety of coating systems were made and evaluated. These systems contain both latexes and pigment systems (unless otherwise specified). The water resistance of the coatings was measured using the Cobb method described by TAPPI method T 441.

EXAMPLE 1

Styrene Acrylic Resin Emulsion/Kaolin Coatings

Eight kaolin-based pigment systems were developed and tested in a coating system comprised of 50 parts (dry basis) (styrene acrylic latex emulsion (SA), 50 parts pigment system (dry basis) and 0.001% defoamer. The SA utilized in this testing phase was a blend of commercially available styrene acrylic resin emulsions produced by BASF Corporation. It is characterized by a solids content of 46% by weight, a pH of 8.3, an acid number of 75 and a Tg(C) of 19. It was designed to give good water and grease resistance to food packaging The SA emulsion and defoamer (Octafoam DFI-51 by Hi Mar Specialty Chemicals) were weighed into a small stainless steel beaker and mixed with a Dispermat mixer fitted with a saw toothed blade. Mixing speed was ramped up until a vortex was created at the agitator shaft. The pigment system was added gradually into the liquid vortex. Once addition was complete, the mixer speed was increased to 1200 rpm and the coating system was allowed to disperse for 10 minutes. The total sample size was approximately 100 g. Coating system solids were targeted at 59.0 percent.

An embodiment of the pigments/pigment systems used in this study is described in Table 1 (below). Two commercially available kaolin pigments were used in the study. The kaolin pigment is platy, having a particle size of 50% by weight finer than 2 micrometers, which is referred to herein as coarse kaolin. The product was initially dried in a flocculated state (3.2 pH) and then dispersed in water with sodium hydroxide to a 7.0 pH. This slurry was then subjected to surface treatment. The fine kaolin pigment is platy, having a particle size of 90% by weight finer than 2 micrometers and an intermediate aspect ratio. The product was initially dried in a flocculated state (3.2 pH). The low pH dry fine kaolin was surface treated with 1.0 percent magnesium stearate for one experiment and also dispersed in water with sodium hydroxide to a 7.0 pH. This slurry was then subjected to surface treatment.

Surface treatments included in the study:

Treatment A: A blend of commercially available SA emulsions (available from BASF Corporation) was used. The composite was formulated for special grease resistance for surface sizing using a process known to the skilled artisan. The resulting product has a pH of 7.3, Acid Number of 108 and a Tg(C) of 14.0. 1.0 weight percent of the SA emulsion was added to the kaolin.

Treatment B: A small particle size, very low volatile organic compound (VOC) polyethylene/paraffin wax emulsion (BASF Corporation) designed for water shedding, heat release and low COF with FDA acceptability was used. The product pH was 9.0, Acid Number of 56, and a Tg(C) of 0.08. 1.0 weight percent of the polyethylene/paraffin wax emulsion was added to the kaolin.

Treatment C: A general purpose, soft film forming SA emulsion (BASF Corporation) for use in water based flexo and gravure inks on flexible films and foil. The product pH was 8.3, Acid Number of 50, and A Tg(C) of −30. 1.0 weight percent of the SA emulsion was added to the kaolin.

Treatment D: A soft film forming acrylic emulsion (available from BASF Corporation) that provides film formation, excellent rub resistance, and water and grease resistance was used. The product pH was 8.3, Acid Number of 50, and a Tg(C) of −16. 1.0 weight percent of the acrylic emulsion was added to the kaolin.

Treatment E: An experimental hydrophobized polyethylenimine (PEI) (MW=800 g/mol) modified with 20% addition of lauric acid (MW=1550 g/mol) was used. 0.5 weight percent of the PEI (dry on dry basis) was added to the kaolin.

Treatment E: An experimental hydrophobized polyethylenimine (PEI) (MW=5000 g/mol) modified with 20% addition of stearic acid (MW=9660 g/mol) was used. 0.5 weight percent of the PEI (dry on dry basis) was added to the kaolin.

Treatment G: Magnesium stearate. 3.0 weight percent added to the kaolin.

TABLE 1

| A | Fine kaolin/Treatment G |
| B | Coarse kaolin/Treatment A |
| C | Coarse kaolin/Treatment B |
| D | Coarse kaolin/Treatment C |
| E | Coarse kaolin/Treatment D |
| F | Coarse kaolin/Treatment E |
| G | Coarse Kaolin/Treatment F |
| H | Fine Kaolin/Treatment E |

The coatings were applied to a Kraft paper, with characteristics described in Table 2.

TABLE 2

| Characteristics of Kraft Paper | |
| --- | --- |
| Basis weight (g/m$^2$) | 100 |
| Roughness (mm) | 7.3 |
| Bendtsen permeance (ml/min) | 4464 |

The Kraft paper selected had a relatively high permeance. As such, a prime coat of a blend of commercially available SA emulsions was applied to each kraft sheet to be coated. The blended product pH was 8.3; Acid Number was 75 and had a Tg(C) of 19.0. This first layer was applied with a #2 Meyer Rod (wire wound bar) on a K-Coater and dried for 1 minute at 50° C. The resultant coating weights were 3.0 g/m$^2$ of dry coating.

Each experimental coating system was applied to the pre-coated kraft base sheet with a #3 Meyer Rod and dried 1 minute at 50° C. targeting a coating weight of 13.0 g/m$^2$ dry coating. The test sheets were then allowed to equilibrate in a constant temperature and humidity environment at 25.5° C. and 40% R.H. before testing.

The control for this series of tests was prepared by coating the same kraft paper twice with SA emulsion blend used to precoat the kraft base paper. This yielded the same total dry coat weight as applied to experimental samples containing 50 weight percent pigment in coating systems.

Water barrier properties were assessed by running the Cobb test according to TAPPI method T 441, with a test area of 100 cm$^2$ and a test time of 2 minutes. To summarize, a 100 cm$^2$ is cut from the coated sheet and weighed to 0.0001 g. The sample was then placed into a test jig coated side up and a metal ring clamped over it. 100 mL of water was poured into the ring and allowed to sit for 2 minutes. At that time, the water was poured out, the sample unclamped and surface dried off with blotting paper and a controlled weight, and the sample reweighed. The "Cobb value" is a measure of how much water the sample has absorbed and is calculated by the equation:

$$Cobb = \frac{mass_{aftersoak} - mass_{initial}}{area}$$

Results are reported in units of g/m². Lower Cobb values indicate greater water resistance.

In this round of testing, three samples of each coating system were measured. The results of the Cobb tests are summarized below in Table 3.

TABLE 3

Water resistance - 2 minute Cobb

| ID | Sample Composition | 2 min Cobb (g/m²) |
|----|-------------------|-------------------|
| A | Fine kaolin/Treatment G | 36.8 |
| B | Coarse kaolin/Treatment A | 4.3 |
| C | Coarse kaolin/Treatment B | 13.1 |
| D | Coarse kaolin/Treatment C | 5.9 |
| E | Coarse kaolin/Treatment D | 19.2 |
| F | Coarse kaolin/Treatment E | 13.9 |
| G | Coarse kaolin/Treatment F | 6.2 |
| H | Fine kaolin/Treatment E | 44.4 |
| Control | Pre-coat SA emulsion blend | 66.0 |

Coating systems B, C, D, F, and G offered the most significant improvement in Cobb and were statistically better than the control. All of the pigments in the pigment systems of the above examples are considered coarse and platy. Synergies were also seen when a styrene acrylic resin emulsion was used for surface treatment. The surface treatment process was of significant importance. Here, the kaolin pigment was first mixed with SA emulsion forming a slurry (15 to 60 percent solids). The slurry was then dried to both encapsulate and anchor the treatment onto the surface of the pigment. This allowed the unique physical properties of a pigment system to take on chemical characteristics of the SA resin coating.

A second unexpected finding was the ease in which hydrophobically treated kaolin pigments can be dispersed into a styrene acrylic resin emulsions. No extensive work input (shear) or temperature manipulation was required to effect formation of a stable slurry. There was no evidence of a chemical interaction during the mixing process as well. In summary, correctly formulated coatings can be pigmented to give improved water resistance.

There are a range of styrene acrylic resin (SA) emulsions available in the marketplace. The performance factors engineered into the emulsion Tg(C), acid number, viscosity, etc.) can greatly influence the barrier performance factors of a given coated substrate. To further demonstrate the viability of the findings in Example 1, the study was repeated with coating prepared using Epotal S 440 styrene acrylic resin emulsion from BASF Corporation. Epotal S 440 is a soft film forming emulsion engineered for direct contact with food. The product pH is 8.0, Acid Number of 64, and a Tg(C) of −27.

EXAMPLE 2

Coatings with Treated Kaolin Pigment System and Epotal S 440

Eleven kaolin-based coating samples were prepared and analyzed during this study. Surface treatments for this study included:

Treatment A: A blend of commercially available SA emulsions from BASF Corporation was used. The product had a pH of 7.3, Acid Number of 108 and a Tg(C) of 14.0. 1.0 weight percent of this product was added to kaolin.

Treatment B: A commercially available (BASF Corporation) small particle size, very low VOC polyethylene/paraffin wax emulsion designed for water shedding, heat release and low COF with FDA acceptability. The product pH was 9.0, Acid Number of 56, and a Tg(C) of 0.08. 1.0 weight percent of this product was added to kaolin.

Treatment C: A commercially available (BASF Corporation), general purpose, soft film forming SA emulsion for use in water based flexo and gravure inks on flexible films and foil was used. The product pH was 8.3, Acid Number of 50, and A Tg(C) of −30. 1.0 weight percent of this product added to kaolin.

Treatment D: A commercially available, soft film forming acrylic emulsion (BASF Corporation) that provides film formation, excellent rub resistance, and water and grease resistance was used. The product pH was 8.3, Acid Number of 50, and a Tg(C) of −16. 1.0 weight percent of this product was added to kaolin.

Treatment E: An experimental hydrophobized polyethylenimine (PEI) (MW=800 g/mol) modified with 20% addition of lauric acid (MW=1550 g/mol) was used. 0.5 weight percent of the PEI (dry on dry basis) was added to the kaolin.

Treatment E: An experimental hydrophobized polyethylenimine (PEI) (MW=5000 g/mol) modified with 20% addition of stearic acid (MW=9660 g/mol) was used. 0.5 weight percent of the PEI (dry on dry basis) was added to the kaolin.

Treatment G: Magnesium stearate. 3.0 weight percent of this product was added to kaolin.

Treatment H. Commercially available siloxane hydrophobizing substituents (from Momentive Performance Materials). 2.0 weight percent of this product was added to kaolin.

The coarse, platy hydrous kaolin pigment described in Example 1 was used in nine of the pigment systems for this study. Sample B, Translink 37, is a commercially available calcined kaolin that has been surface treated with siloxane based hydrophobizing chemistry. This BASF pigment does not have a platy or coarse morphology. In Sample P, the dispersion chemistry of the coarse, platy hydrous kaolin pigment was modified to include a sodium polyacrylate (molecular weight in the 3500 range).

The coatings tested in this report were comprised of 50% pigment system (dry basis), 50% Epotal S 440 (on a wet basis), and 0.1 parts Octafoam DFI-51 defoamer by Hi Mar Specialty Chemicals. Target coating solids were 59.0%. Epotal S 440 has a solids content of 49.4 wt %, so the total weight of the emulsion was 20.24 parts.

Epotal S 440 and the defoamer were weighed into a small stainless steel beaker and mixed with a Dispermat mixer fitted with a toothed blade at a relatively low speed to start. The pigment system was added gradually into the vortex, and once the full amount had been added, the mixing speed was increased to 1200 rpm and mixing proceeded for 10 minutes. It was also necessary to add some water to these samples to maintain a workable viscosity of 1000 cps. The total sample size was approximately 100 g. The pigments used in this study are described below:

TABLE 4

| | |
|---|---|
| A | Fine kaolin/Treatment G |
| B | Translink 37 |
| C | Coarse kaolin untreated |
| D | Coarse kaolin/Treatment H |
| E | Coarse kaolin/Treatment G |
| F | Coarse kaolin/Treatment A |
| G | Coarse Kaolin/Treatment B |
| H | Coarse kaolin/Treatment C |
| I | Coarse kaolin/Treatment E |
| J | Coarse kaolin/Treatment F |
| K | Sodium polyacrylate dispersed coarse kaolin untreated |

With the exception of C and K, all kaolin pigments were surface treated. All pigment samples in the above examples readily dispersed and demonstrated good shelf stability. A few displayed some syneresis with softly settled pigment that was easily stirred back in. The coating made with pigment system D, however, had a layer of firmly settled pigment at the bottom which required some energy to stir and shake back into the liquid phase—a characteristic of well dispersed samples.

The coatings were tested on kraft paper, with characteristics described in Table 5:

TABLE 5

| | |
|---|---|
| Basis weight (g/m$^2$) | 100 |
| Roughness (mm) | 7.3 |
| Bendtsen permeance (mL/min) | 4464 |

Because the paper had a relatively high permeance, a prime coat of Epotal S440 was first diluted to 31% solids and applied to every sheet before the experimental coating. This first layer was applied with a #2 Meyer Rod on the K-Coater, and dried for 1 minute at 50° C., yielding a dry coating weight of 3.0 g/m$^2$. Each experimental coating was then applied with a #3 Meyer Rod and dried 1 minute at 50° C., yielding a dry coating weight of 13.0 g/m$^2$. The test sheets were allowed to equilibrate in a constant temperature and humidity environment at 25.5° C. and 40% R.H. before testing.

The control for the pigmented coatings was generated using 100% undiluted Epotal S 440, which conveniently had the same solids content as the pigmented coatings. The control kraft sheets were first prime coated with diluted Epotal S 440 and then coated (one coat) of the undiluted emulsion equivalent to 13.0 gm$^2$ of dry coating.

The results of the Cobb tests are summarized below in Table 6.

TABLE 6

Water Resistance vs. Pigment System

| ID | Sample Composition | 2 min Cobb g/m$^2$ |
|---|---|---|
| A | Fine kaolin/Treatment G | 3.4 |
| B | Translink 37 | 1.4 |
| C | Coarse kaolin Untreated | 7.5 |
| D | Coarse kaolin/Treatment H | 3.0 |

TABLE 6-continued

Water Resistance vs. Pigment System

| ID | Sample Composition | 2 min Cobb g/m$^2$ |
|---|---|---|
| E | Coarse kaolin/Treatment G | 3.3 |
| F | Coarse kaolin/Treatment A | 2.1 |
| G | Coarse kaolin/Treatment B | 2.4 |
| H | Coarse kaolin/Treatment C | 2.1 |
| I | Coarse kaolin/Treatment E | 1.5 |
| J | Coarse kaolin/Treatment F | 1.0 |
| K | Sodium Polyacrylate dispersed coarse kaolin untreated | 6.3 |
| L | Control - 100% Epotal S 440 | 3.9 |

All of the coating systems containing surface treated pigment systems outperformed the control. The performance of Pigment B, Translink 37, points to a finding that, once surface treated, calcined kaolin can be effectively utilized in water barrier applications. This is a significant finding in the development of water barrier coating systems.

The benefit of using the styrene acrylic resin emulsion used as a surface treatment was confirmed in this study. The Cobb values of the two coating systems containing untreated coarse and platy morphology (Coatings C and K) were poorer than Epotal S 440 control (Coating L). The Cobb values on the same kaolin pigment when surface treated with styrene acrylic resin emulsion (Coatings F, G, and H) were all better than the Epotal S 440 control coating.

When comparing the results from Examples 1 and 2, the impacts of the pigment systems are similar. When comparing styrene acrylic resin emulsions, the Epotal S 440 makes much more water resistant coatings. This could be due to the lower Tg(C) of Epotal S 440 (−27° C. vs. 19° C.), as softer polymers tend to form more continuous films when dried.

EXAMPLE 3

Hydrophobizing Styrene Acrylic Resin Emulsions

Examples 1 and 2 demonstrated the ease in which hydrophobically surface treated pigments could be dispersed in styrene acrylic resin emulsion. A number of studies were subsequently conducted to determine whether this finding could be extended to develop a method for hydrophobizing a styrene acrylic resin emulsion in lieu of surface treating the pigment component of the barrier coating system. Silane, siloxane, and poly-dimethyl siloxane/silicon resin hydrophobic surface treatments were used with Epotal S 440 and other commercially available styrene acrylic resin emulsions from BASF Corporation.

In Table 7 (below), Epotal S 440 was incrementally treated with commercially available poly-dimethyl siloxane hydrophobizing substituents from Momentive Performance Materials. The treatment was added to the Epotal S 440 under mild agitation at room temperature. No evidence of a chemical reaction was observed during the treatment process.

A commercially available uncoated board base paper from MeadWestvaco (MWV) was then coated. The test sheets were allowed to equilibrate in a constant temperature and humidity environment at 25.5° C. and 40% R.H. and were then subjected to Cobb testing (TAPPI Method T441). The data clearly demonstrates the benefits of the treatment method.

TABLE 7

| Sample ID | Coat Weight (g/m²) | 30 minute Cobb Avg (g/m²) |
|---|---|---|
| Raw Base Stock | 0.0 | 80.65 |
| Epotal S 440 control | 20.2 | 5.10 |
| Epotal S 440 with 0.25 part of hydrophobizing chemistry | 19.6 | 7.10 |
| Epotal S 440 with 0.50 part of hydrophobizing chemistry | 21.0 | 9.80 |
| Epotal S 440 with 0.75 part of hydrophobizing chemistry | 20.2 | 7.55 |
| Epotal S 440 with 1.0 part of hydrophobizing chemistry | 20.3 | 3.70 |
| Epotal S 440 with 1.25 part of hydrophobizing chemistry | 20.4 | 3.70 |
| Epotal S 440 with 1.50 part of hydrophobizing chemistry | 19.1 | 4.10 |
| Epotal S 440 with 1.75 part of hydrophobizing chemistry | 19.4 | 3.00 |
| Epotal S 440 with 2.0 part of hydrophobizing chemistry | 20.5 | 3.65 |

EXAMPLE 4

Comparison of a Coating System Including Pre-treating Pigment Versus a System Including Untreated Pigment with Post Addition of Hydrophobizing Chemistry Example 3 demonstrated that a method for hydrophobizing a styrene acrylic resin emulsion can be used to obtain an aqueous based coating system with untreated pigments that includes many of the desired properties of the coating system include the surface treated pigment. A number of studies were subsequently conducted to further compare the two types of coating systems. In the comparisons, silane, siloxane, and poly-dimethyl siloxane/silicon resin hydrophobic surface treatments of the pigments and the post-addition for untreated pigments. Both used Epotal S 440 and other commercially available styrene acrylic resin emulsions from BASF Corporation, as the polymer emulsion system.

In Tables 8 and 9 below, two coatings were tested. The first coating included pigments pre-treated with siloxane (Dow Corning 2-1912, which is a commercially available siloxane from Dow Corning) in an amount of 1% without any post-addition of hydrophobizing substituents. The second coating included untreated pigments with post-addition of the same siloxane used in the first coating as the hydrophobizing substituent. Both coatings included a combination of Epotal S 440 and Acronal S 504, which is a commercially available acrylic resin emulsion from BASF Corporation. The treatment and pigments were added to the Epotal S 440 under mild agitation at room temperature.

Rheological stability of the coatings were tested, the results of which are presented in Table 10 below. Also, a commercially available uncoated board base paper from MeadWestvaco was then coated with each of the two coatings to form test sheets for Cobb testing. The test sheets were subjected to TAPPI Method T441 to obtain Cobb Coffee absorption averages. The Cobb test results are also presented in Table 10 below. The data demonstrates that many of the benefits of embodiments of the coating system including surface treated pigments can also be obtained in embodiments of the coating system with untreated pigments where post-addition of hydrophobizing substituents are added.

TABLE 8

First Coating With Pre-Treated Pigment And No Post-Addition

| Components | Solids (%) | Dry | Wet |
|---|---|---|---|
| Epotal S 440 | 47.6 | 56.25 | 65.23 |
| Acronal S 504 | 49.4 | 18.75 | 20.95 |
| DC 2-1912 | 100 | 0.25 | 0.14 |
| Defoamer | 100 | 0.05 | 0.03 |
| Untreated Kaolin | 100 | 24.75 | 13.7 |
| Pre-treated Kaolin | 100 | 0 | 0 |

TABLE 9

Second Coating With Untreated Pigment and Post-Addition

| Components | Solids (%) | Dry | Wet |
|---|---|---|---|
| Epotal S 440 | 47.6 | 56.25 | 55.42 |
| Acronal S 504 | 49.4 | 18.75 | 17.80 |
| DC 2-1912 | 100 | 0 | 0 |
| Defoamer | 100 | 0.05 | 0.02 |
| Untreated Kaolin | 100 | 0 | 0 |
| Pre-treated Kaolin | 100 | 25 | 11.7 |

TABLE 10

|  | First Coating | Second Coating |
|---|---|---|
| Brookfield viscosity (50 rpm) | | |
| First week | 640 | 600 |
| Second week | 600 | 640 |
| Third week | 600 | 640 |
| High shear (dynes/4400 rpm) | | |
| First week | 28.6 | 28.4 |
| Second week | 28 | 28.4 |
| Third week | 27.3 | 28.4 |
| 30 min Cobb Coffee Absorption Avg (g/m²) | 10.0 | 10.7 |

The coatings were also visually tested for nibs and fish eyes. The first coating had some fish eyes present, no nibs using a spatula rub test after 30 minutes of mixing, and pigment addition had minimal float. The second coating had no fish eyes, no nibs using a spatula rub test after 2 hours of mixing, and pigment addition floated.

EXAMPLE 5

Coatings Systems Compared for Both Water and Water Vapor Transmission Rates

A series of evaluations were conducted to test the water resistant coating systems to water vapor barrier coatings. In this example, three styrene acrylic resin emulsions and two kaolin based pigment systems were evaluated. Binding systems selected were:

Epotal S 440: A commercially available a soft film forming SA emulsion engineered for direct contact with food. The product pH was 8.0, Acid Number of 64, and a Tg (C) of −27° C.

Resin Emulsion A: A water based, high performance, hybrid RC acrylic emulsion polymer offered by BASF Corporation. It is typically 40% solids, and was used as received. Its Tg (C) was 15° C. and 80° C. with an average particle size obtained from PCS of 163 nm. This emulsion offered improved resistance properties and low COF.

Copolymer A: An aqueous copolymer dispersion of butyl acrylate and styrene offered commercially by BASF Corporation. Its target use is in ceramic tile mastic adhesives, primers and other construction adhesives. Benefits include good water resistance and strength.

The coating substrate was a heavyweight kraft liner. The curve of the sheets and the difference in water beading behavior between the different sides of the sheets suggested that it had undergone some type of surface treatment. Other characteristics are described below in Table 11.

TABLE 11

Base Paper Properties

| | |
|---|---|
| Caliper | 385 pm |
| Basis weight | 260 g/m$^2$ |
| Roughness | 8.95 pm |
| Permeance - Gurley | 66.7 seconds |
| Permeance - Bendtsen | 178.2 ml/min |

Pigments were limited to kaolin that were coarse and platy (described in Examples 1 and 2); that was dried in a flocculated state (3.2 pH); and Translink 37. Coating systems were made by mixing the pigments into the target binding system with a small amount of defoamer (less than 0.20 parts) and enough water to bring the coatings to 50% solids by weight. The pigment to binder (P/B) ratio of the coatings was 1:1.

Coating systems were prepared by weighing the binder system and defoamer (Octafoam DFI-51 by Hi Mar Specialty Chemicals) into a small beaker. The beaker contents were agitated by a Dispermat mixer fitted with a saw toothed blade. Mixing speed was ramped up until a vortex was created at the agitator shaft. The pigment system was added gradually into the vortex, and once the full amount had been added, the mixing speed was increased to 1200 rpm and the slurry was allowed to mix for 10 minutes. The total sample size was approximately 100 g. Coating system solids were targeted at 59.0 percent.

The coatings were applied with wire-wound bars chosen to give the target dry coating weight. To get 10 g/m$^2$ coat weight with coatings at 50% solids, a K3 applicator bar was used. The coated sheets were dried in the 50° C. oven for 1 minute. For 30 g/m$^2$ dry coat weight, the coating systems based on Epotal S 440 and Copolymer A were applied in 2 coats; first with the K3 bar, followed by 1 minute in the oven, then another coat with the K5 bar. The coating system based on Resin Emulsion A could not be overcoated. They were applied in a single pass with the K7 bar. Initial Cobb testing on some of the sheets showed a great dependence of properties as a function of drying time, therefore, the 30 g/m$^2$ coated sheets were allowed to dry in oven at 50° C. for approximately 2 hours.

Water resistance of the coatings was tested with the Cobb method, described by TAPPI T 441. A test area of 100 cm$^2$ was used, but in this case the testing time was 30 minutes instead of 2 minutes. MVTR was measured on the MOCON Permatran-W Water Vapor Permeation Measurement System. This instrument measures the transmission rate of water vapor through a substrate by keeping the atmosphere one side of the sample at a constant relative humidity while flooding the other side with a stream of dry nitrogen. The nitrogen flows past the substrate and then on to an IR detector which measures how much water has been picked up by the gas. The permeability of the uncoated base paper was too high to allow MVTR measurement by the MOCON Permatran-W Water Vapor Permeation Measurement System. The amount of water vapor that came through overwhelmed the instrument's detector. The MVTR of this sample was alternatively measured by the cup method (ASTM D 1653).

Table 12 denotes the 30 minute Cobb data at both 10 g/m$^2$ and 30 g/m$^2$ coat weights. Table 13 denotes MVTR values at 30 g/m$^2$ coat weight.

TABLE 12

30 minute Cobb data

| Coating | 30-minute Cobb @ 10 g/m$^2$ dry coat weight | 30-minute Cobb @ 30 g/m$^2$ dry coat weight |
|---|---|---|
| Epotal S 440 | 11.6 | NA |
| Epotal S 440/Translink 37 | 11.5 | 3.6 |
| Epotal S 440/Coarse Kaolin | 55.6 | 16.6 |
| Copolymer A | 77.1 | 3.4 |
| Copolymer A/Translink 37 | 37.7 | 3.5 |
| Copolymer A/Coarse kaolin | 96.3 | 56.4 |
| Resin Emulsion A | 12.9 | 0.0 |
| Resin Emulsion A/Translink 37 | 35.6 | 7.5 |
| Resin Emulsion A/Coarse kaolin | 47.3 | 5.4 |
| Bare substrate | 104.3 | |

The data showed that increasing coating weight improves the water resistance of the coated liner. In general, at a pigment to binder ratio of 1:1, the untreated coarse, platy kaolin does not provide the same level of water resistance as 100% resin. However, Translink 37 generally has a beneficial or comparable effect on water resistance depending on the resin used with it. Translink 37 and Epotal S 440 at 10 g/m$^2$ have water resistance comparable to 100% Epotal s 440 and 100% Resin Emulsion A. It is significantly better than 100% Copolymer A. The combination of coarse platy kaolin and Resin Emulsion A at 30 g/m$^2$ has exceptional performance. This higher coating weight, however, might prove uneconomical in manufacturing practice. The choice of using a filled/extended system must be weighed against the potential necessity of increasing the coating weight to achieve the desired properties. The Joncryl 3030/Translink 37 gave results that would make this system viable for applications that require high level of water resistance.

For MVTR testing, the sheets coated with 30 g/m$^2$ dry coat weight were tested at tropical conditions; of 38° C. and 90% relative humidity.

TABLE 13

MVTR Test Results

| Coating | MVTR at tropical conditions and @ 30 g/m$^2$ dry coat weight |
|---|---|
| Epotal S 440 | 409.5 |
| Epotal S 440/Translink 37 | 830.9 |
| Epotal S 440/Coarse kaolin | 277.2 |
| Copolymer A | 467.8 |
| Copolymer A/Translink 37 | 608.9 |
| Copolymer A/Coarse kaolin | 330.1 |
| Resin Emulsion A | 227.2 |
| Resin Emulsion A/Translink 37 | 1204 |

TABLE 13-continued

MVTR Test Results

| Coating | MVTR at tropical conditions and @ 30 g/m² dry coat weight |
|---|---|
| Resin Emulsion A/Coarse kaolin | 442.1 |
| Bare substrate | 1439.7 |

In MVTR testing, Translink 37 does not appear to provide beneficial effects relative to the neat binders. The coarse, platy kaolin pigment demonstrates a beneficial effect on vapor transmission resistance when combined with Epotal S 440 and Copolymer A but not with Resin Emulsion A. It can be concluded that different coating formulations may be necessary to achieve desired liquid water resistance and water vapor barrier properties. To improve water resistance, a hydrophobically treated kaolin seems to work best when combined with the right resin like Epotal S 440. For vapor transmission resistance, a pigment that provides tortuosity, i.e., increases the path travelled by vapor as it penetrates and passes through the coating appears to be needed. The coarse, platy kaolin pigment used in this study appears to provide the tight particle packing needed and when used with the proper resin can enhance MVTR.

EXAMPLE 6

Dispersing Effect of Silanes, Siloxanes, and Poly-siloxane/Silicone Resin Blends on Styrene Acrylic Resin Emulsions While assessing the benefits of hydrophobically surface treated pigment systems in water barrier applications, an unexpected finding was that silanes, siloxane, and poly-siloxane/silicone resin treatments have a beneficial dispersing effect on styrene acrylic resin emulsions. The resulting lower coating system viscosity offers multiple benefits—chief being the ability to increase pigment system loading with acceptable film forming capabilities. It also provides a needed degree of freedom to include additives that will improve coating efficiency and the quality of the film surface.

Table 14 demonstrated the benefits of this dispersion/coating system viscosity. Here, the coarse and platy kaolin pigment cited earlier was dried in the flocculated state (3.2 pH) and was hydrophobized by surface treatment with a commercially available siloxane hydrophobizing treatment (up to 2.0 percent by weight) supplied by Momentive Performance Materials. For comparison, the same kaolin pigment was left untreated and was also hydrolyzed by magnesium stearate surface treatment (up to 3.0% by weight). Epotal S 440 was selected as the binder component of the coating systems.

The coating systems were prepared by weighing the Epotal S 440 and defoamer (Octafoam DFI-51 from Hi Mar Specialty Chemicals) into a small beaker. The beaker contents were mixed with a Dispermat mixer fitted with a saw toothed blade. Mixing speed was ramped up until a vortex was created at the agitator shaft. The pigment system was added gradually into the vortex, and once the full amount had been added, the mixing speed was increased to 1200 rpm and the slurry was allowed to mix for 10 minutes. The total sample size was approximately 100 g. Coating system solids were targeted at 59.0 percent. Brookfield viscosity was measured initially and after 24 hours to factor out the potential for entrained air biasing results as seen with siloxane treatment.

TABLE 14

| Coating System | Epotal S 440 | 1:1 Epotal S 440/Coarse kaolin | 1:1 Epotal S 440/Coarse kaolin + siloxane | 1:1 Epotal S 440/Coarse kaolin + Magnesium Stearate |
|---|---|---|---|---|
| Coating System Solids | 46.0% | 58.3% | 59.0% | 59.0% |
| Initial Brookfield Viscosity No. 3 @ 20 RPM | 1200 cps. | 2100 cps. | 1650 cps. | 2300 cps. |
| 24 Hour Brookfield Viscosity No. 3 @ 20 RPM | 1250 cps. | 2300 cps. | 625 cps. | 2550 cps. |

The dispersion benefits seen with the siloxane surface treatment apply to a range of reactive silicone fluids. Silane substituent (i.e., vinyl-tris(2-methoxyethoxy)silane), siloxanes and poly-dimethylsiloxane/silicone resin blends were tested. To one practiced in the art, it should be readily apparent that this finding can be extended to carbon based analog chemistries as well as other compounds exhibiting similar performance characteristics. This dispersion benefit was seen in the range of styrene acrylic resin emulsions thus far tested in water barrier applications.

EXAMPLE 7

Efficient Incorporation of Hydrophobic Pigment Systems in Styrene Butadiene Latex During the development of novel water barrier coating systems, the industry suggested a need for a styrene butadiene latex based coating system. As stated in the aforementioned examples, a highly efficient water barrier coating system contains a hydrophobized pigment system or a hydrophobized styrene acrylic resin emulsion. To those skilled in the art, a hydrophobized pigment cannot be readily dispersed into a water based styrene butadiene latex. To facilitate this need in the marketplace, a novel method of pigment system incorporation has been developed which capitalizes on the enhanced dispersing effect of reactive silicone fluids such as silanes, siloxane, and poly-siloxane/silicone resin blends on styrene acrylic resin emulsions (Example 6). The hydrophobized pigment system was first added to a styrene acrylic resin emulsion. This system was then readily dispersed into styrene butadiene latex.

The data in Table 15 demonstrates the performance of Translink 37 and a new hydrophobized water barrier pigment system that have been incorporated into a commercially available styrene butadiene latex (Epotal 4430). The new pigment system comprises thermally treated kaolin that has been hydrophobized by surface treatment with a poly-dimethylsiloxane/high molecular weight silicone resin blend (available from Dow Corning). The designation of this new product is Product 100. Product 100 exhibits improved water barrier properties (Cobb) when compared to Translink 37 in coating systems tested.

Product 100 is also considered to be acceptable for food packaging, since the poly-dimethylsiloxane/high molecular weight silicone resin blend is compliant with food safety, as each of the individual substituents is approved by the FDA for applications in food.

Translink 37 and Product 100 were incorporated into Epotal 4430 using as little as 9.0 dry parts of styrene acrylic resin emulsion (Epotal S 440 in this example) to 100 parts of the pigment system. In particular embodiments, chemical order of addition can be critical. Mixing can be accomplished with a Dispermat mixer equipped with a saw tooth disk. First, approximately 80% of the required Epotal S 440 was added to the makeup water required for the coating system. The required Product 100 or Translink 37 pigment system was then added to this blend. These hydrophobized pigment systems floated but will readily incorporate when the remaining Epotal S 440 is added with agitation set at 2000 RPM. Complete incorporation was achieved without the need for other surfactants/defoamers within 5 minutes. The resulting slurry is stable. There is no preferential order of addition needed when adding the Epotal S 440/pigment system slurry and target styrene butadiene latex (Epotal 4430 in this case). Only moderate agitation (1200 RPM) is required for efficient mixing. 0.1 parts defoamer (Octafoam DFI-51 from Hi Mar Specialty Chemicals) was added during this final mixing step to minimize the presence of entrained air in the costing system. A thickening aid (Sterocoll FD) was added to raise the coating system Brookfield viscosity above 500 cps.

TABLE 15

| Pigment System | Coating System Solids (%) | Brookfield Viscosity (2@100 RPM) | Hercules Viscosity @16 Dynes |
|---|---|---|---|
| Translink 37 | 57.0 | 80 | 960 RPM |
| Product 100 | 56.7 | 90 | 567 RPM |

Improved Sealability and Blocking of Coated Substrates

In certain embodiments, coatings that provide a barrier to water, moisture, grease, oil, oxygen etc. should also have the ability to form a seal and not block during the manufacturing process. For example, paper or paperboard used in a cup that will contain cold or hot liquids must be able to be sealed when the front and back sides of the paper or paperboard are joined and subjected to elevated temperature and pressure and the seal itself must also be resistant to liquid or moisture vapor and maintain its integrity in their presence. To further improve on the heat sealability of the coating systems of this invention, resin combinations were tested. Two pigments were evaluated in these studies: Product 101, a thermally treated kaolin pigment, and Product 100, a thermally treated kaolin pigment that has been hydrophobized by a commercially available poly-dimethylsiloxane/high molecular weight silicone resin blend.

The binder systems tested were composed of the following components:

Epotal S 440: A commercially available a soft film forming SA emulsion from BASF Corporation. It is engineered for direct contact with food. The product pH was 8.0, Acid Number of 64, and a Tg(C) of −27° C.

Binder A: A commercially available styrene acrylic emulsion from BASF Corporation. The product pH was 7.6 with an Acid Number of 57, and a Tg(C) of −4° C.

Epotal 4430: A commercially available aqueous dispersion of a carboxylated styrene/butadiene copolymer from BASF Corporation. Its target use is in the manufacture of laminating adhesives. It has outstanding mechanical, chemical stability and displays excellent adhesion.

Binder B: A commercially available aqueous dispersion of a carboxylated styrene/butadiene copolymer from BASF Corporation.

These binder systems were selected and tested based on anticipated improvements in heat sealing due to $T_g$ or similarity to materials currently used in heat sealing processes.

Coatings were applied to the cup stock with wire wound bars on the K-Control Coater. The target dry coat weight was 5.7 g/m². In many cases, this was achieved with 2 layers of a coating at 40% solids with the K2 bar; in other cases, depending on the percent solids and viscosity or the presence of wax, other combinations of bars or a single layer coating was used. Coated sheets were dried 2 minutes at 50° C. after each layer, then allowed to equilibrate in the constant temperature and humidity room for 2 days before testing.

Cobb testing was performed according to TAPPI test method T-441. The test area was 25 cm² and the test time was 30 minutes. Four replicates of each condition were tested. Based on previous lab and trial work it was established that for hot cups a Cobb value of 12 g/m² was acceptable so any sample with performance equal or better than that material was considered acceptable in our testing.

Heat sealing was evaluated on a Sencorp model 12ASL/1 sealer. The temperature of both the top and bottom jaws was set at 600° F. for all test conditions. Coated sheets were placed face to face and sealed at various times and pressures. The most common sealing times were 0.25, 0.35 and 0.5 seconds, based on information that cup sealing rates of 150 cups/minute (0.4 seconds/cup) were acceptable. Pressures were varied from 20 to 30 to 40 psi. After sealing and cooling to room temperature, the two pieces of board were pulled apart, and rated on the level of adhesion. Samples were given a rating of 1 to 5, based on the following scale:

1—No adhesion
2—Adhesion, but no picking or fiber tears
3—Adhesion with coating transfer or slight fiber tear (<5% or surface area)
4—Some fiber tear (5-50%)
5—Fiber tear (>50%)

Since maximum adhesion at the lowest possible times and pressures was desirable, higher ratings are better.

Blocking resistance was evaluated with a Koehler Instruments block tester. The samples were cut into 1.5"×1.5" pieces and placed face-to-face and face-to-back. A small metal plate with a circular hole was placed on top of the samples to keep them positioned, a spring with a circular metal face is then placed on top. The spring was compressed, in this case to 20 mm, corresponding to a pressure of 15.2 psi, the test rig was then placed in a 50° C. oven for 16 hours. At the end of that time, the rig was removed from the oven, and the samples were removed and allowed to cool to room temperature. Once cooled, the individual pieces were separated and the degree of adhesion noted. Samples were given a rating of 1 to 5, based on the following scale:

1—No adhesion
2—Slight adhesion
3—Some adhesion, no material transfer between surfaces
4—Strong adhesion, perhaps with material transfer between surfaces
5—Fiber tear In this case, because blocking in a coated roll should be minimized, lower ratings are better.

EXAMPLE 8

Evaluation of Binder Combinations

In this group of tests, the effects of different binders were evaluated. Binder A was used as a control because it is used in other heat seal applications, but not approved for direct food contact. In Table 16, Cobb and blocking test results are delineated for the binder combinations evaluated. The heat sealing results are reported in Table 17.

TABLE 16

| Description | Dry coat weight (g/m²) | Cobb (g/m²) | Face-to-face blocking (lower better) |
|---|---|---|---|
| PE - extruded commercial | N/A | 0.61 | 2 |
| Standard pigmented coating | N/A | 12.04 | 3 |
| Epotal S 440 | 5.7 | 6.45 | 2 |
| Binder A | 5.7 | 6.80 | 5 |
| Epotal S 440 + Epotal 4430 (75:25) | 5.7 | 5.26 | 3 |
| Epotal S440 + Binder B (75:25) | 5.7 | 4.85 | 3 |

TABLE 17

| Time (sec) | PE at 20 PSI | PE at 30 PSI | PE at 40 PSI |
|---|---|---|---|
| 0.5 | 4-5 | 4-5 | 4-5 |
| 0.35 | 4-5 | 4-5 | 4-5 |
| 0.25 | 4 | 4-5 | 4-5 |

| Time (sec) | Standard Pigmented Coating at 20 PSI | Standard Pigmented Coating at 30 PSI | Standard Pigmented Coating at 40 PSI |
|---|---|---|---|
| 0.5 | 1 | 4 | 4 |
| 0.35 | 1-2 | 2 | — |
| 0.25 | 1 | 1-2 | — |

| Time (sec) | Epotal S 440 at 20 PSI | Epotal S 440 at 30 PSI | Epotal S 440 at 40 PSI |
|---|---|---|---|
| 0.5 | — | — | — |
| 0.35 | 3 | — | 5 |
| 0.25 | 3 | 3 | 4 |

| Time (sec) | Binder A at 20 PSI | Binder A at 30 PSI | Binder A at 40 PSI |
|---|---|---|---|
| 0.5 | 4-5 | 4-5 | 4-5 |
| 0.35 | 5 | 4-5 | 4-5 |
| 0.25 | 4 | 4-5 | 4-5 |

TABLE 17-continued

| Time (sec) | Epotal S 440 + Epotal 4430 at 20 PSI | Epotal S 440 + Epotal 4430 at 30 PSI | Epotal S 440 + Epotal 4430 at 40 PSI |
|---|---|---|---|
| 0.5 | 4-5 | 4-5 | 4-5 |
| 0.35 | 4-5 | 4-5 | 4-5 |
| 0.25 | 5 | 4-5 | 4-5 |

| Time (sec) | Epotal S 440 + Binder B at 20 PSI | Epotal S 440 + Binder B at 30 PSI | Epotal S 440 + Binder B at 40 PSI |
|---|---|---|---|
| 0.5 | 4-5 | 4-5 | 4-5 |
| 0.35 | 4-5 | 4-5 | 4-5 |
| 0.25 | 4 | 4-5 | 4-5 |

All of the coatings have acceptable Cobb values and all, but Binder A, have reasonably acceptable blocking. Epotal S 440 by itself as well as the other binders sealed better than the pigmented standard coating. The performance of the others showed that there is room to improve sealing performance by changing the binder system.

It might be expected that the addition of pigment will reduce the ability of the coating to seal, but may improve Cobb performance and reduce blocking. Two kaolin pigments were tested: Product 101 and Product 100. Each was dispersed with a Cowles blade in Epotal S 440 at a ratio of 55 parts kaolin to 45 parts resin solids, along with defoamer. Table 18 lists the systems tested and Table 19 the heat sealing results.

TABLE 18

| Description | Dry coat weight (g/m²) | Cobb (g/m²) | Face-to-face blocking (lower better) |
|---|---|---|---|
| 100% Epotal S 440 | 5.7 | 6.45 | 2 |
| Pigmented coating (Epotal S 440 + kaolin) | N/A | 12.04 | 3 |
| 45% Epotal S 440 + 55% Product 100 | 5.7 | 5.35 | 1.5 |
| 45% Epotal S 440 + 55% Product 101 | 5.7 | 13.59 | 1.5 |

The combination of Epotal S 440 and Product 100 (hydrophobically surface treated calcined kaolin) gave superior Cobb values to the untreated calcined kaolin. However, all of the exemplary systems gave acceptable Cobb results for cold and hot cup applications. The pigmented systems gave superior blocking results.

TABLE 19

| Time (sec) | Epotal S 440 at 20 PSI | Epotal S 440 at 30 PSI | Epotal S 440 at 40 PSI |
|---|---|---|---|
| 0.5 | — | — | 4-5 |
| 0.35 | 3 | — | 5 |
| 0.25 | 3 | 3 | 4 |

| Time (sec) | Pigmented Standard at 20 PSI | Pigmented Standard at 30 PSI | Pigmented Standard at 40 PSI |
|---|---|---|---|
| 0.5 | 1 | 4 | 4 |
| 0.35 | 1-2 | 2 | — |
| 0.25 | 1 | 1-2 | 1-2 |

| Time (sec) | Epotal S 440 + Product 101 at 20 PSI | Epotal S 440 + Product 101 at 30 PSI | Epotal S 440 + Product 101 at 40 PSI |
|---|---|---|---|
| 0.5 | 1 | 2 | 3 |
| 0.35 | 1-2 | 1-2 | 1-2 |
| 0.25 | 1-2 | 1-2 | 1-2 |

TABLE 19-continued

| Time (sec) | Epotal S 440 + Product 100 at 20 PSI | Epotal S 440 + Product 100 at 30 PSI | Epotal S 440 + Product 100 at 40 PSI |
| --- | --- | --- | --- |
| 0.5 | 2 | 3 | 4 |
| 0.35 | 1 | 2 | 2 |
| 0.25 | 1-2 | 1-2 | 1-2 |

The heat seal results indicate that the addition of kaolin pigment in a 55:45 ratio negatively impacts heat sealability overall, resulting in less adhesion at each sealing condition when compared with Epotal S 440 by itself, but yields results comparable to the Pigmented Standard.

Blends of Epotal S 440 and Epotal 4430 were next tested (Table 20 and Table 21) to evaluate the effect of the binder system on heat sealability. A 75:25 blend of Epotal S 440 and Epotal 4430 (referred to as "Binder 1") and a blend of 43:57 75:25 blend of Epotal S 440 and Epotal 4430 ("Binder 2"). The kaolin pigment system was dispersed in each coating system at a pigment to binder ratio of 55:45.

TABLE 20

| Description | Dry coat weight (g/m$^2$) | Cobb (g/m$^2$) | Blocking (lower better) |
| --- | --- | --- | --- |
| Epotal S 440 + Product 100 | 5.7 | 5.35 | 1.5 |
| Binder 1 + Product 100 | 5.7 | 3.80 | 2 |
| Binder 2 + Product 100 | 5.7 | 3.97 | 3 |

TABLE 21

| Time (sec) | Epotal S 440 + Product 100 at 20 PSI | Epotal S 440 + Product 100 at 30 PSI | Epotal S 440 + Product 100 at 40 PSI |
| --- | --- | --- | --- |
| 0.5 | 2 | 3 | 4 |
| 0.35 | 1 | 2 | 2 |
| 0.25 | | | |

| Time (sec) | Binder 1 + Product 100 at 20 PSI | Binder 1 + Product 100 at 30 PSI | Binder 1 + Product 100 at 40 PSI |
| --- | --- | --- | --- |
| 0.5 | 3 | 5 | |
| 0.35 | 3 | 3 | 4 |
| 0.25 | 1 | 1 | 2 |

| Time (sec) | Binder 2 + Product 100 at 20 PSI | Binder 2 + Product 100 at 30 PSI | Binder 2 + Product 100 at 40 PSI |
| --- | --- | --- | --- |
| 0.5 | 2 | 5 | |
| 0.35 | 2 | 3 | 3 |
| 0.25 | | | |

A blend of 75:25 parts Epotal S 440 and Epotal 4430 performs slightly better than the blend with more Epotal 4430.

The best formulation tested is comprised of 75:% Epotal S 440/25% Epotal 4430 binder system at a pigment to binder ratio 55:45 with Product 100 hydrophobically treated kaolin. This represents an improvement over the performance of the straight Epotal S 440/kaolin system.

EXAMPLE 9

Evaluation of Blocking Additives

In this group of tests, the effects of different blocking additives were evaluated. \ In Table 22, blocking test results are delineated for the different additives evaluated. Also, a blocking test results are shown for coating systems without any blocking additive, but with different pigment to resin ratios.

The blocking rating is from 0 to 4 with 0 having no delamination, 1-2 having noise, and 4-5 having delamination. Cobb coffee is determined in the same manner as in the previous examples.

Joncryl Wax is a commercially available polyethylene-paraffin wax emulsion from BASF. Joncryl 3025, 3040, and 3050 are commercially available styrene-acrylic emulsions from BASF. Calson 50 and 65 are commercially available calcium stearates from BASF. Acronal Optive 4655X is a commercially available acrylic resin from BASF. Styronal 4606 is a commercially available styrene-butadiene latex binder from BASF.

TABLE 22

MKT2012-0069 Barrier Coating Blocking Improvement Study Lab Results

| Samples | Description | | Coat weight g/m2 | Static Kinetic | COF | Cobb Coffee | Blocking | HS | HS+ | Cobb |
|---|---|---|---|---|---|---|---|---|---|---|
| J110512-01 | Control 1 | (23.5 M09-2033:76.5 D2/CR2/SL3) | 24.7 | 1.06 | 0.65 | 14.9 | 4 | 4 | 4 | 12.81 |
| J110512-02 | Control 2 | (25 M09-2033:75 Resin G) | 24.4 | 0.92 | 0.63 | 9.9 | 3 | 3 | 3.5 | 10.4 |
| J110512-03 | Joncryl Wax 120 | (5.0 parts) | 24.4 | 0.80 | 0.54 | 9.5 | 1 | 1 | 1.5 | 9.45 |
| J110512-04 | Joncryl Wax 120 | (10 parts) | 24.4 | 0.86 | 0.50 | 7.6 | 1 | 1 | 1.5 | 8.12 |
| J110512-05 | Joncryl 3025 | (23.15 parts) | 24.6 | 0.62 | 0.54 | 9.5 | 1 | 1 | 1 | 44.91 |
| J110512-06 | Joncryl 3025 | (46.3 parts) | 24.8 | 0.67 | 0.55 | 36.9 | 0 | 0 | 0.5 | 1.66 |
| J110512-07 | Joncryl 3040 | (46.3 parts) | 24.4 | 0.66 | 0.52 | 9.4 | 1 | 1 | 1.5 | 5.86 |
| J110512-08 | Joncryl 3050 | (46.3 parts) | 24.3 | 0.53 | 0.46 | 6.9 | 0 | 0 | 0.5 | 7.42 |
| J110512-09 | Calsan 50 | (0.5 part) | 25.9 | 1.10 | 0.73 | 13.7 | 3 | 3 | 3.5 | 10.96 |
| J110512-10 | Calsan 50 | (1.0 part) | 25.1 | 1.13 | 0.74 | 14.3 | 2 | 2 | 3 | 11.28 |
| J110512-11 | Calsan 50 | (2.0 parts) | 24.8 | 1.07 | 0.71 | 15.4 | 3 | 3 | 3.5 | 9.49 |
| J110512-12 | Calsan 65 | (0.5 part) | 24.7 | 1.25 | 0.75 | 20.2 | 3 | 3 | 3.5 | 12.73 |
| J110512-13 | Calsan 65 | (1.0 part) | 24.2 | 1.18 | 0.72 | 15.4 | 3 | 3 | 3.5 | 13.96 |
| J110512-14 | Calsan 65 | (2.0 parts) | 25.2 | 0.82 | 0.71 | 14.7 | 3 | 3 | 3.5 | 10.92 |
| J110512-15 | Acronal Optive 4655X | (30.2 parts) | 24.9 | 1.07 | 0.65 | 10.8 | 1 | 1 | 1.5 | 8.54 |
| J110512-16 | Styronal 4606 | (30.2 parts) | 24.6 | 0.93 | 0.69 | 9.2 | 2 | 2 | 3 | 8.29 |
| J110512-17 | D2/CR2/SL3 (23.5 M09-2033) | 100% resin | 24.3 | 1.25 | 0.78 | 11.5 | 3 | 3 | 3.5 | 8.74 |
| J110512-18 | D2/CR2/SL3 (23.5 M09-2033) | 100% resin | 25.3 | 1.16 | 0.77 | 9.7 | 3 | 3 | 3.5 | 9.77 |
| PE Coated Control | PE Coated Control | MWV Coated | 16.3 | 0.36 | 0.30 | 1.0 | | | | |
| 15 pt MWV Base | 15 pt base | MWV supplied | (Basis wt) 278.9 | 0.40 | 0.31 | 89.6 | | | | |

While the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A pigment system comprising,
a pigment surface treated with a hydrophobized polyethyleneimine, an acrylic latex emulsion, a styrene-acrylic latex emulsion, a styrene-butadiene latex emulsion, a blend of a styrene acrylic latex emulsion and a styrene butadiene latex emulsion, a silane, a siloxane, or a siloxane/silicone resin blend, wherein the pigment comprises kaolin, wherein the surface treatment is present in an amount of from 0.5% to 2% by weight of the pigment, and
wherein the hydrophobized polyethyleneimine, the acrylic latex emulsion, the styrene-acrylic latex emulsion, the styrene-butadiene latex emulsion, the blend of a styrene acrylic latex emulsion and a styrene butadiene latex emulsion, the silane, the siloxane, or the siloxane/silicone resin blend forms a film.

2. The pigment system of claim 1, wherein the pigment is calcined kaolin.

3. The pigment system of claim 1, wherein the pigment is surface treated with the acrylic latex emulsion.

4. An aqueous based coating system comprising the pigment system of claim 1 and a polymer emulsion system or natural-based binding system.

5. The aqueous based coating system of claim 4, wherein the polymer emulsion system comprises a styrene-acrylic resin emulsion.

6. The aqueous based coating system of claim 4, wherein the aqueous based coating system further comprises an additive to improve blocking, wherein the additive is selected from the group consisting of calcium stearate and polyethylene-paraffin wax emulsion.

7. A pigment system comprising,
a pigment surface treated with a hydrophobized polyethyleneimine, an acrylic latex emulsion, a styrene-acrylic latex emulsion, a styrene-butadiene latex emulsion, a blend of a styrene acrylic latex emulsion and a styrene butadiene latex emulsion, a silane, a siloxane, or a siloxane/silicone resin blend,
wherein the surface treatment is present in an amount of from 0.5% to 2% by weight of the pigment,
wherein the pigment comprises kaolin,
wherein the entire surface of the pigment has been surface treated, and wherein the hydrophobized polyethyleneimine, the acrylic latex emulsion, the styrene-acrylic latex emulsion, the styrene-butadiene latex emulsion, the blend of a styrene acrylic latex emulsion and a styrene butadiene latex emulsion, the silane, the siloxane, or the siloxane/silicone resin blend, forms a film.

8. The pigment system of claim 7, wherein the pigment is calcined kaolin.

9. An aqueous based coating system comprising the pigment system of claim 7 and a polymer emulsion system or natural-based binding system.

10. The aqueous based coating system of claim 9, wherein the polymer emulsion system comprises a styrene-acrylic resin emulsion.

11. The aqueous based coating system of claim 9, wherein the aqueous based coating system further comprises an additive to improve blocking, wherein the additive is selected from the group consisting of calcium stearate and polyethylene-paraffin wax emulsion.

12. A pigment system comprising, a pigment surface treated with a hydrophobized polyethyleneimine modified with lauric acid or stearic acid, wherein the pigment comprises kaolin.

13. The pigment system of claim 12, wherein the pigment system further comprises an additive to improve blocking, wherein the additive is selected from the group consisting of calcium stearate and polyethylene-paraffin wax emulsion.

14. The pigment system of claim 12, wherein the hydrophobized polyethyleneimine is present in an amount of from 0.5% to 2% by weight of the pigment.

15. The pigment system of claim 12, wherein the pigment is calcined kaolin.

16. An aqueous based coating system comprising the pigment system of claim 12 and a polymer emulsion system or natural-based binding system.

17. The aqueous based coating system of claim 16, wherein the polymer emulsion system comprises a styrene-acrylic resin emulsion.

18. The aqueous based coating system of claim 16, wherein the aqueous based coating system further comprises an additive to improve blocking, wherein the additive is selected from the group consisting of calcium stearate and polyethylene-paraffin wax emulsion.

19. The pigment system of claim 1, wherein the pigment is surface treated with a hydrophobized polyethyleneimine, an acrylic latex emulsion, a styrene-acrylic latex emulsion, a styrene-butadiene latex emulsion, or a blend of a styrene acrylic latex emulsion and a styrene butadiene latex emulsion.

20. The pigment system of claim 7, wherein the pigment is surface treated with a hydrophobized polyethyleneimine, an acrylic latex emulsion, a styrene-acrylic latex emulsion, a styrene-butadiene latex emulsion, or a blend of a styrene acrylic latex emulsion and a styrene butadiene latex emulsion.

* * * * *